United States Patent [19]

Crommelynck et al.

[11] Patent Number: 4,486,255
[45] Date of Patent: Dec. 4, 1984

[54] METHOD AND MACHINE FOR REMOVING AT LEAST ONE LAYER OF REINFORCING ELEMENTS FROM A BREAKER OR BELT OF A RUBBER TIRE

[75] Inventors: Roger Crommelynck, Deerlijk; Eddy Quartier, Wevelgem, both of Belgium

[73] Assignee: N. V. Bekaert S. A., Zwevegem, Belgium

[21] Appl. No.: 536,745

[22] Filed: Sep. 28, 1983

[30] Foreign Application Priority Data

Oct. 5, 1982 [BE] Belgium .............................. 1/10601

[51] Int. Cl.³ ...................... B32B 35/00; B29H 21/01
[52] U.S. Cl. .................................... 156/98; 156/153; 264/36; 157/13; 51/DIG. 33
[58] Field of Search ...................... 156/96, 98, 94–95, 156/97, 110.1, 153, 154, 247–248; 157/13; 51/DIG. 33; 264/36

[56] References Cited

U.S. PATENT DOCUMENTS

| 3,117,047 | 1/1964 | Capistrant et al. | 156/96 |
| 3,375,153 | 3/1968 | Antraigue | 156/98 |
| 3,426,828 | 2/1969 | Neilsen | 157/13 |
| 3,460,419 | 8/1969 | Branick | 83/185 |
| 3,830,120 | 8/1974 | Peterson | 157/13 |
| 3,888,145 | 6/1975 | Heaton et al. | 157/13 |
| 4,071,071 | 1/1978 | Graves et al. | 157/13 |
| 4,092,196 | 5/1978 | Miller et al. | 157/13 |

FOREIGN PATENT DOCUMENTS

| 2209133 | 8/1973 | Fed. Rep. of Germany | 157/13 |
| 2344479 | 8/1974 | Fed. Rep. of Germany | 157/13 |
| 2305096 | 8/1974 | Fed. Rep. of Germany | |
| 828137 | 2/1960 | United Kingdom | 157/13 |
| 306037 | 4/1971 | U.S.S.R. | 51/DIG. 33 |

Primary Examiner—Lois E. Boland
Attorney, Agent, or Firm—Edward J. Brenner

[57] ABSTRACT

This invention relates to a method and machine for removing at least one layer of reinforcing elements from a breaker or belt of a rubber tire.

According to the method of the invention for removing at least one layer of reinforcing elements, such as steel cords, etc. from a breaker or belt located between the tread area and the carcass of a rubber tire; the tread area of the tire is first removed down to the layer of reinforcing elements by rasping off this tread area, and afterwards each reinforcing element, for example each steel cord, of the layer to be removed is cut through in at least one place and the so cut reinforcing elements are removed by further rasping.

This invention further relates to a machine for carrying out this method.

3 Claims, 3 Drawing Figures

U.S. Patent   Dec. 4, 1984   4,486,255
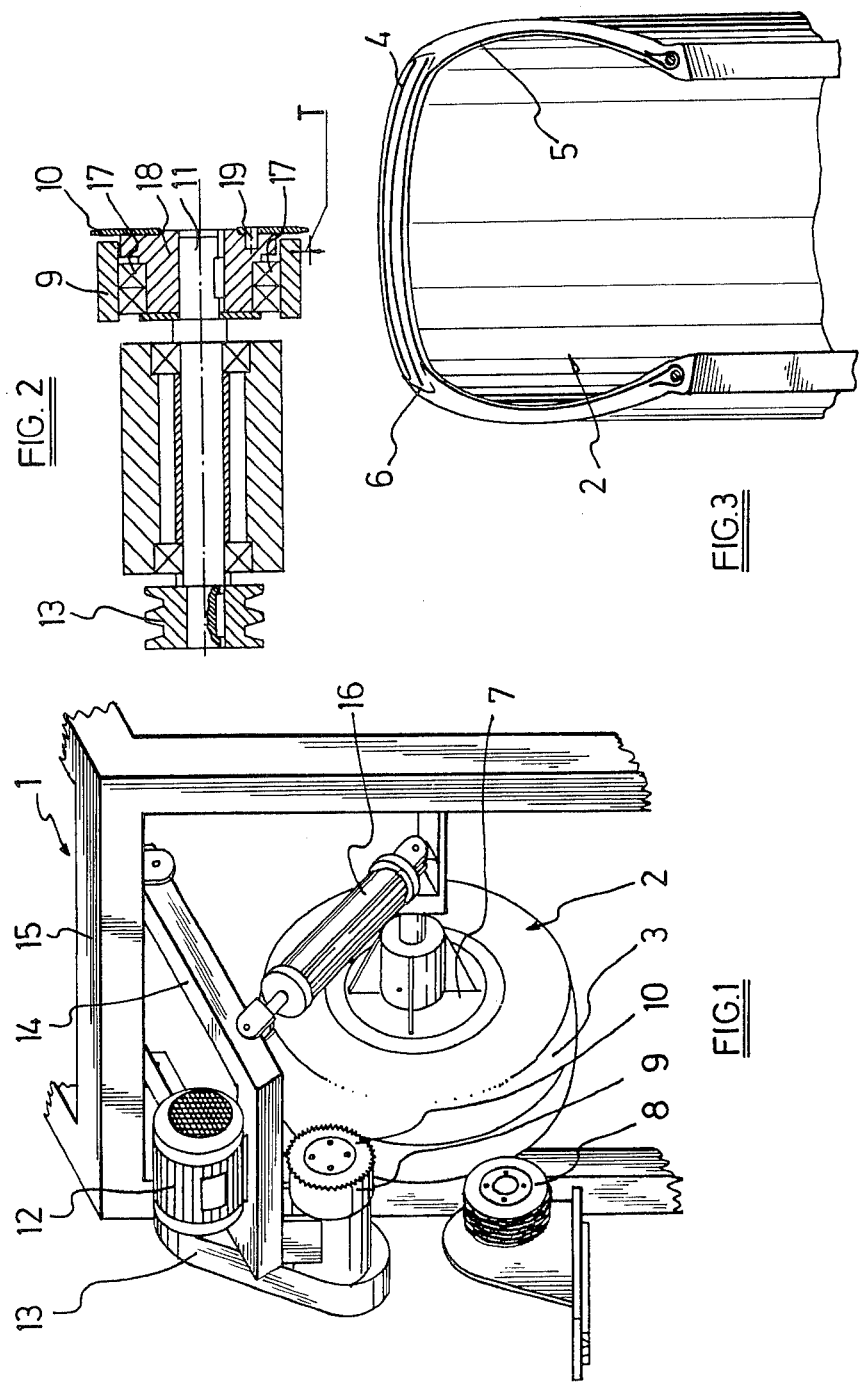

METHOD AND MACHINE FOR REMOVING AT LEAST ONE LAYER OF REINFORCING ELEMENTS FROM A BREAKER OR BELT OF A RUBBER TIRE

The invention relates to a method and a machine for removing at least one layer of reinforcing elements, such as steel wires, steel cords, etc. from a breaker or belt of a rubber tire, such as a truck tire.

The invention particularly relates to a method of removing at least one layer of reinforcing elements, such as steel wires, steel cords, etc. from a breaker or belt located between the tread area and the carcass of a rubber tire. In this method, first the tread area of the tire is taken away by scouring or rasping down to the layer of reinforcing elements.

It is a widely known operation to repair worn rubber tires, such as truck tires, aeroplane tires, etc. by providing the tires with a new tread area and/or sidewalls. It is also already known, whenever required, to remove one or more layers of reinforcing elements from the breaker or belt located between the tread area and the carcass of the rubber tire and to replace them by one or several new layers of rubber strips provided with the reinforcing elements.

The removal of the tread area of a worn tire is done on a machine specially designed for this purpose. Such a known machine is provided with, among other things, means for gripping the tire between two clamping plates, pressurizing the tire, turning the tire about its axis, and with rotating stripping rasps for scouring or rasping the rubber off the tread area. Such machines are sold by, among other firms, Collman of Lübeck, Germany.

The removal of one or several rubber layers containing reinforcing elements, such as steel wires, steel cords, etc. from the breaker or belt located between the tread area and the carcass of the rubber tire can also be achieved by means of such known machines provided with the said stripping rasps.

The disadvantage is that the entire length of the reinforcing elements across the full width of the layer is pulled out during the rasping operation so that also large portions of rubber are torn off. Hence, this operation does not allow to obtain a substantially smooth rubber surface on which afterwards the new rubber strips containing the reinforcing elements must be wound. As a result it is difficult to obtain good adhesion between the layers of the repaired tire. Another disadvantage is that the ripped-off reinforcing elements, such as steel cords, hook into each other so that an effective rasping operation is rendered quite difficult.

Another already known method for the removal of such rubber layers containing reinforcing elements consists in pressing an elongate and specially designed knife starting from one of the sidewalls of the inflated tire through the rubber, turning the tire about its axis, and deflating it to remove the thus detached layer. A drawback of this method is that pressing such an elongate knife starting from one of the sidewalls of the tire underneath such a layer of reinforcing elements is a difficult operation. Indeed, with such great forces it is hard to control whether the knife moves underneath the layer or between the reinforcing elements of the layer. Another disadvantage is that in the case of considerable local damages to the tire, e.g. by rust formation, it is difficult to remove the layer in an expert or correct way owing to the bad control of the cutting operation. A further disadvantage is that after the rasping operation by means of the stripping rasps in view of removing the rubber of the tread area, another tool, i.e. the elongate knife, must be mounted on the machine in order to proceed to the next operation.

It is an object of the invention to eliminate the above-mentioned drawbacks.

Therefore, the invention provides in the method of the type mentioned at the outset, that each reinforcing element, such as a steel wire, steel cord, etc. of the layer to be removed is cut through in at least one spot, after which the thus cut reinforcing elements are removed by further scouring or rasping.

An advantage of this method is that the removal of the parts of the cut reinforcing elements by rasping with the stripping rasps can now be carried out without difficulty, viz. without damaging the rubber or the reinforcing elements of the underlying layers.

Another advantage is that in this way a substantially smooth, rasped rubber surface is obtained, which strongly contributes to the good adhesion of the rubber layer containing the reinforcing elements to be applied on it afterwards.

Preferably, each reinforcing element of the layer to be removed is cut through in various spots or places over its length.

The invention also relates to a modified embodiment of the machine described above for scouring off the tread area of a tire.

The embodiment or machine according to the invention is characterized in that it is also provided with a pressure roller to be placed on the tire and on which at least one knife is mounted. Preferably, ball bearings allow the pressure roller to rotate freely with respect to the knife whose contour is substantially circular. The distance between the circumference of the pressure roller and that of the knife is adjustable. The knife mounted on a shaft is preferably driven by a motor via a chain-gear transmission. Preferably, several substantially parallel and regularly spaced knives are mounted on a shaft driven by the motor.

An important advantage of the machine according to the invention is that it enables to cut through in a simple manner all reinforcing elements, e.g. steel wires, steel cords, etc. of one single layer in an arbitrary number of spots.

Another advantage is that both the process of removing a layer of reinforcing elements and the process of removing the tread area of the tire can take place on the same machine so that both processes can follow each other immediately.

The invention will now be further clarified with reference to the following drawings in which:

FIG. 1 is a perspective and schematic view of a part of the machine according to the invention for removing at least one layer of reinforcing elements of a breaker or belt of a rubber tire;

FIG. 2 is a detailed and cross-sectional view of the pressure roller to be placed on the tire with one corresponding knife, and FIG. 3 is a cross-sectional view of a tire of which the tread area has been substantially entirely removed.

FIG. 1 is a perspective and schematic view of a part of a possible embodiment of the machine 1 for carrying out the method according to the invention. A tire 2 of which the tread area 3, as well as at least one layer of reinforcing elements 4, such as steel wires or steel cords, must be removed from the breaker or belt 6 located between the tread area 3 and the carcass 5, is gripped between the clamping plates 7 of the machine 1. The machine 1 also contains means for pressurizing the tire 2 and for rotating it about its axis. The machine 1 is also provided with stripping rasps 8 which can be driven and reciprocated across the width of the tire. Such stripping rasps are for example known from U.S. Pat. No. 2,703,446 and Austrian Pat. No. 324,865. As already said the arrangement described is widely known.

According to the invention, the machine 1 is provided with a pressure roller 9 to be applied on the tire 2, and on which a circular knife 10 is mounted. The knife 10 is driven by a shaft 11 connected to a motor 12 via a chain-gear transmission 13. The pressure roller 9, the knife 10, the shaft 11, the motor 12 and the chain-gear transmission 13 are fixedly mounted on a U-shaped arm 14 which is hingedly fixed to the frame 15 of the machine 1. The up-and-down movement of the U-shaped arm 14 with respect to the tire 2 or the frame 15 is actuated by a pressure cylinder 16.

FIG. 2 shows a detailed cross-sectional view of how the circular knife 10 is freely rotatable, via ball bearings 17, with respect to the pressure roller 9 so that the roller 9 and the knife 10 can freely rotate with respect to each other. The distance T between the circumference of the roller 9 and the knife 10 substantially determines the cutting depth of the knife 10 and this distance T is defined by the mounting of the knife 10 with respect to a supporting block 18 fixedly mounted on the driven shaft 11. It is clear, that it is possible to make the distance T adjustable or regulatable, for example by providing a circular knife 10 with a greater or smaller circumference. It is also possible to provide several substantially parallel spaced knives 10 on the shaft 11, e.g. by means of a number of supporting blocks 18 fixedly mounted on the shaft 11, whereby each supporting block 18 carries a knife 10. For the sake of clarity, the embodiment, shown in FIGS. 1 and 2, carries only one supporting block 18 with the corresponding knife 10.

The method according to the invention will now be described. By means of the machine 1 shown in FIG. 1 the tread area 3 of the tire 2 is substantially completely scoured off with the stripping rasps 8. Therefore, the pressurized tire 2 is rotated in a given direction whereas the stripping rasps 8 rotating in the opposite direction are continuously reciprocating against the tread area 3. As soon as the tread area 3 has been substantially removed, or, in other words, as soon as the first layer of reinforcing elements 4 of the breaker or belt 6 has been reached, the stripping or rasping operation is stopped by switching off the stripping rasps 8. FIG. 3 shows a cross-sectional view of such a tire 2 of which the tread area has been substantially stripped off.

Now, according to the invention, the pressure roller 9 with the knife 10 mounted on it, is pressed against the tire 2 by means of the pressure cylinder 16, whereby the tire 2 is again rotated in a given direction while the circular knife 10 turns in the opposite direction. As it appears from the FIGS. 1 and 2, the circular knife 10 penetrates into the tire down to a depth T and only the wires or cords 4 of the top reinforcing layer of the breaker will be cut through provided the distance between the two uppermost successive layers of reinforcing elements (FIG. 3) of the breaker 6 is greater than the distance T. As already described above, the distance T is easily adjustable and it can be provided that the distance T is smaller than the distance between two successive layers of reinforcing elements of the breaker 6. As already described above, it is possible to provide several knives 10 on the shaft 11 so that it is possible to cut through the wires or cords 4 of each layer in several places.

After cutting the reinforcing elements 4, the pressure roller 9 with the corresponding knives 10 is removed from the tire 2 by the hinging action of the arm 14 actuated by the pressure cylinder 16. The thus cut wire or cord sections 4 are now removed by reciprocating the stripping rasps 8 again against the tire, as for removing the rubber from the tread area. As all the reinforcing elements are cut in at least one place, it is also possible to remove in a simple manner these parts of the elements 4 by means of the known stripping rasps 8, whereby a substantially smooth, rasped rubber surface is obtained.

We claim:

1. A method for removing at least one layer of reinforcing elements, such as steel cords, from a breaker or belt located between the tread area and the carcass of a rubber tire, whereby first the tread area of the tire is removed down to the layer of reinforcing elements by rasping off the tread area, characterized in, that afterwards each reinforcing element (4), for example steel cord, of the layer to be removed is cut in at least one place, after which the thus cut reinforcing elements (4) are removed by further rasping.

2. A method according to claim 1, characterized in, that each reinforcing element is cut substantially in the middle of its length.

3. A method according to claim 1, characterized in, that each reinforcing element is cut in several places.

* * * * *